No. 791,086. PATENTED MAY 30, 1905.
I. DEUTSCH.
SELF ALINING BEARING.
APPLICATION FILED APR. 30, 1903.

Witnesses.
J. E. L. Blackmore
R. S. Trotter

Inventor.
Isidor Deutsch
by Fred B. Fetherstonhaugh
Atty.

No. 791,086.

Patented May 30, 1905.

UNITED STATES PATENT OFFICE.

ISIDOR DEUTSCH, OF MONTREAL, CANADA, ASSIGNOR TO ELECTRIC AND TRAIN LIGHTING SYNDICATE, LIMITED, OF MONTREAL, CANADA, A CORPORATION OF CANADA.

SELF-ALINING BEARING.

SPECIFICATION forming part of Letters Patent No. 791,086, dated May 30, 1905.

Application filed April 30, 1903. Serial No. 155,079.

*To all whom it may concern:*

Be it known that I, ISIDOR DEUTSCH, a citizen of the United States of America, residing at Montreal, in the district of Montreal, in the Province of Quebec, Canada, have invented certain new and useful Improvements in Self-Alining Bearings, of which the following is a specification.

My invention relates to improvements in self-alining bearings; and the object of the invention is to devise a bearing in a machine which shall adjust itself readily to any change of position of the shaft in relation to the machine and yet form a solid and unbroken journal-bearing, and whereby the bushing can be removed without difficulty and in a comparatively short space of time; and it consists, essentially, of a bearing having an unbroken inner portion suitably recessed, a bushing spherically formed in the middle thereof and having a teat projecting therefrom and designed to fit into the aforesaid recessed portion of the bearing, and a cover-plate forming the outer portion of the bearing and having a recessed portion designed to fit over the bushing, the various parts being constructed in detail as hereinafter more particularly described.

Figure 1:
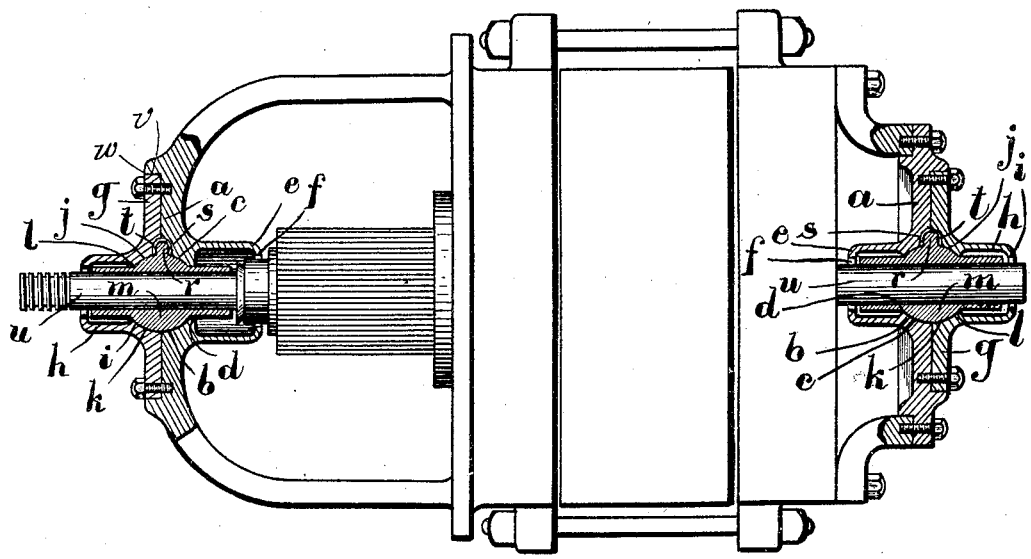
Figure 2:
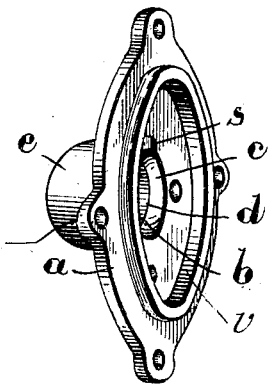
Figure 3:
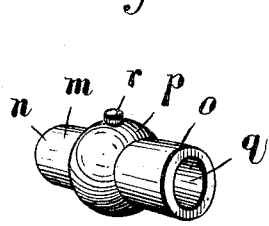
Figure 4:
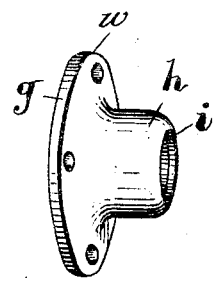

Figure 1 is a sectional view of the bearings applied to the construction of a dynamo. Fig. 2 is a perspective view of the inner portion of the bearing when said inner portion is separable from the machine. Fig. 3 is a perspective view of the bushing. Fig. 4 is a perspective view of the cover-plate.

Like letters of reference indicate corresponding parts in each figure.

$a$ is the inner portion of the bearing, which is preferably a portion of the frame of the machine, though it must be understood that without departing from the spirit of the invention it may be bolted onto the frame.

$b$ is the journal-orifice in the bearing $a$, internally recessed at $c$ and converging toward its inner opening $d$.

$e$ is a casing, preferably forming part of the frame, projecting inwardly, surrounding the bearing, and having the opening $f$.

$g$ is an outer bearing-plate or cover-plate having the outwardly-extending portion $h$ provided with the opening $i$.

$j$ is a journal-orifice in the outer bearing-plate $g$, internally recessed at $k$, the said recess converging toward the outer opening $l$.

$m$ is a bushing having the cylindrical ends $n$ and $o$ and the substantially spherical portion $p$ centrally situated between the cylindrical ends $n$ and $o$ and preferably forming one piece therewith.

$q$ is an orifice through the bushing $m$ and designed to receive the shaft of the machine.

$r$ is a teat projecting from the spherical portion of the bearing.

$s$ and $t$ are recesses in the plates $a$ and $g$ and are designed together to form one recess when the plates are together to receive the teat $r$ and to allow the latter a certain play therein.

$u$ is the shaft of the machine, projecting through the bearing.

$v$ is an annular guide in the inner portion $a$ of the bearing, designed to receive the guide-surface $w$ on the outer portion of the bearing.

Having described the various parts involved in my invention, I shall now explain the utility thereof.

The inner bearing-plate $a$ is shown in Fig. 1 at one end of the dynamo as forming a portion of the large casting, while at the other end it is a separate plate bolted to the casting, and the advantages of this will be more fully described hereinafter.

The bushing $m$ is placed in the journal-orifice $b$ over the shaft $u$, one-half of the spherical and middle portion $p$ fitting into the correspondingly internally-recessed portion $c$ of the said orifice $b$ and one-half of the teat $r$ projecting from the said spherical portion fitting into the recess $t$ in the inner bearing-plate $a$. The outer bearing-plate $g$ is now slipped onto the shaft and over the outwardly-projecting portion of the bushing $m$ and the internally-recessed part of the orifice $i$ fitting over the projecting half of the spherical portion $p$ of the bushing $m$, and the recess $s$ in the outer bearing-plate $g$ fitting over the projecting half of the teat $r$. The outer plate $g$ is now firmly secured to the inner plate $a$ by suitable bolts, and the bearing is complete, the portions $e$ and $h$, projecting inwardly and outwardly, respectively, from the bearing-plates, serving to catch the oil slung by the rotation of the shaft. This bearing is designed to adjust itself to the vibratory movements of the machine or the connections thereto and also to perfect the alinement in the insertion and replacing of bushings.

A further advantage obtained in my device is that when the same is applied to the construction of dynamos one end of the machine may have an opening large enough to remove the core simply by the removal of the center bearing. The inner bearing in order to provide this construction must be separate from the frame of the machine and be bolted securely thereto when the bearing is in place.

What I claim as my invention is—

1. In a self-alining bearing, the combination with the shaft, of a supporting-hub split in a vertical plane, having its inner member extended and flanged to form a sunken seating-surface for its outer member substantially in alinement with the dividing-plane said plane extending transversely of the axis of the bearing, and bolts extending through the outer member to the said inner member, a suitable bushing fitting in between the aforesaid members of the supporting-hub, as and for the purpose specified.

2. In a self-alining bearing, the combination of two members fitted together and with their meeting surfaces in a plane extending at right angles to the axis of the bearing, each of said members having a cup-shaped socket, and each having an annular centering-surface, the centering-surface on one fitting against that on the other and a bushing held in the cup-shaped sockets, substantially as described.

3. In a self-alining bearing, the combination of two members fitted together and with their meeting surfaces in a plane extending at right angles to the axis of the bearing, each of said members having cup-shaped socket, and each having an annular centering-surface, the centering-surface on one fitting against that on the other and a bushing held in the cup-shaped sockets, said bushing having a teat projecting therefrom in between the members of the bearing, substantially as described.

4. In combination in a bearing, two members fitted together in a plane at right angles to the axis of the bearing, said members having centering-surfaces in contact with each other and extending concentric to the axis of the bearing and each having a cup-shaped socket and a bushing in the said sockets, substantially as described.

5. In a self-alining bearing, the combination with the shaft, of a bearing comprising two members abutting in a vertical plane to a guiding-surface substantially at right angles to the dividing-plane, and concentric with the journal-orifice, and a suitable bushing fitting in between the said two members one of said members having a flange thereon fitting against the periphery of the other member, as and for the purpose specified.

Signed at Montreal, in the district of Montreal, in the Province of Quebec, Canada, this 27th day of April, 1903.

ISIDOR DEUTSCH.

Witnesses:
J. E. L. BLACKMORE,
R. T. TROTTER.